O. B. STILLMAN.
ADJUSTABLE STALL.
APPLICATION FILED MAR. 30, 1911.
1,016,182.
Patented Jan. 30, 1912.
2 SHEETS—SHEET 1.
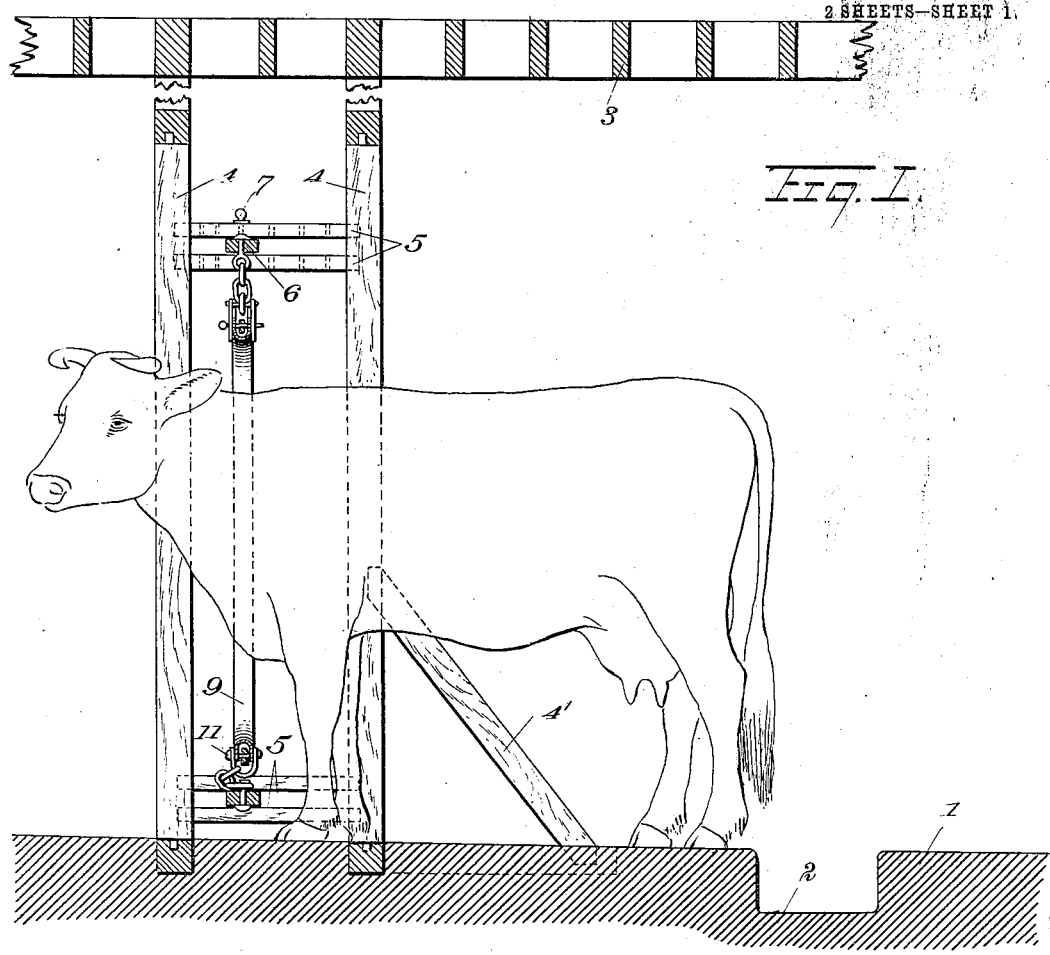
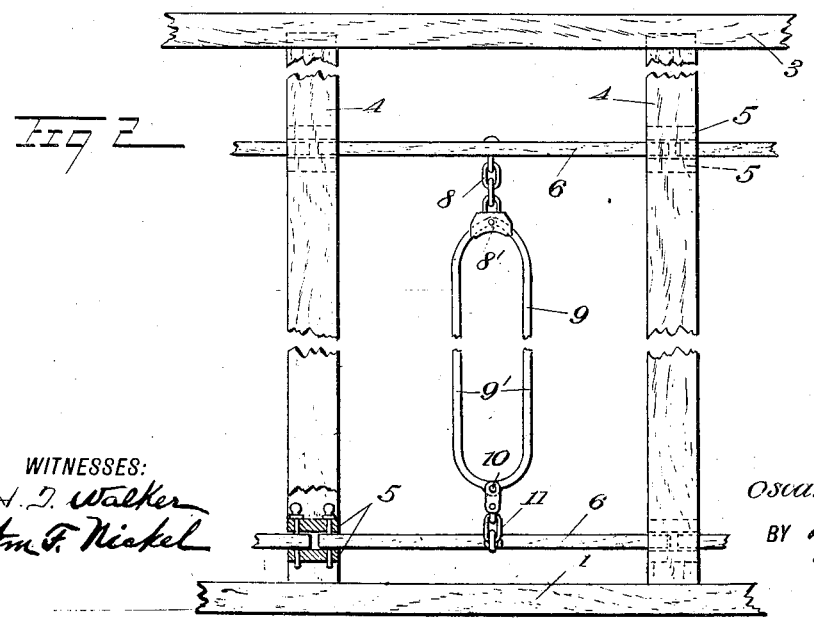
WITNESSES:
H. D. Walker
Wm. F. Nickel
INVENTOR
Oscar B. Stillman
BY Munn & Co
ATTORNEYS

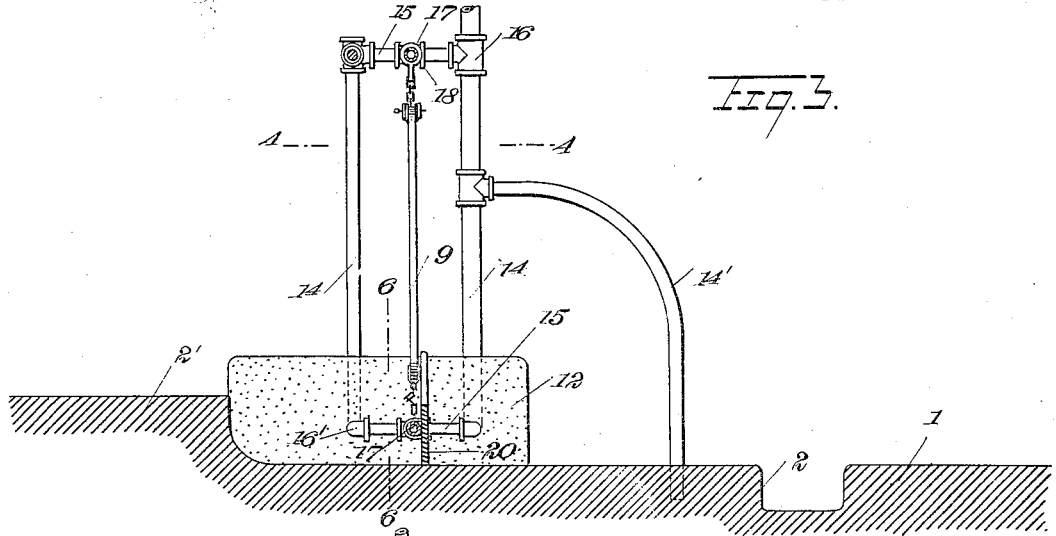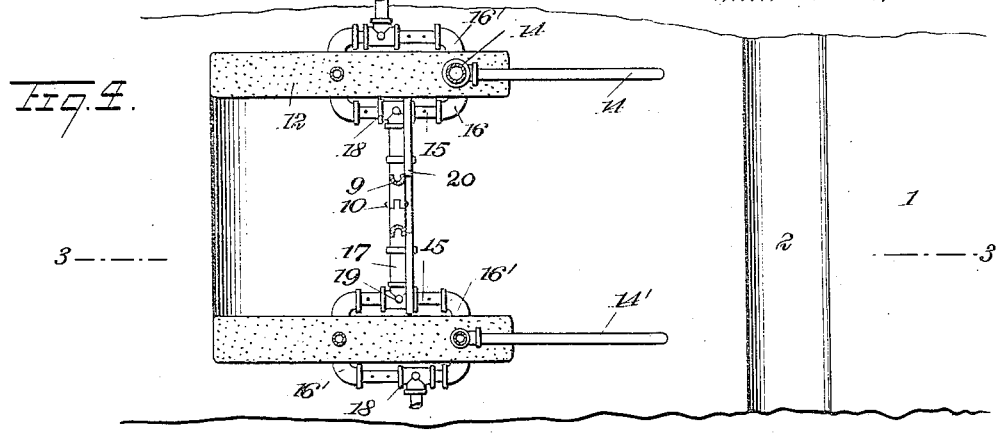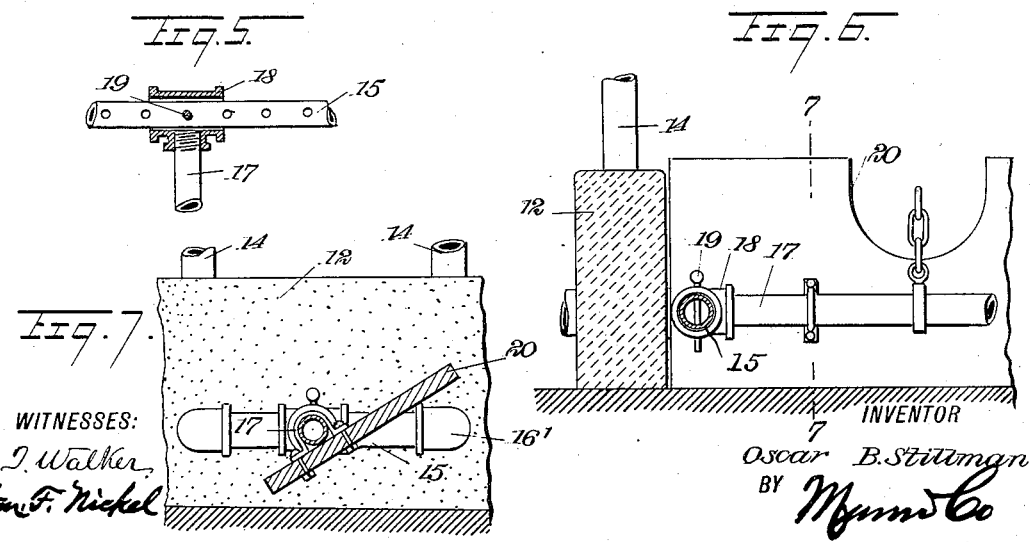

UNITED STATES PATENT OFFICE.

OSCAR BISHOP STILLMAN, OF WASHINGTONVILLE, NEW YORK.

ADJUSTABLE STALL.

1,016,182.  Specification of Letters Patent.  Patented Jan. 30, 1912.

Application filed March 30, 1911. Serial No. 617,835.

*To all whom it may concern:*

Be it known that I, OSCAR B. STILLMAN, a citizen of the United States, and a resident of Washingtonville, in the county of Orange and State of New York, have invented a new and Improved Adjustable Stall, of which the following is a full, clear, and exact description.

My invention is a stall, preferably a cow stall, so constructed that the length thereof can be readily changed to suit the size of the animal occupying the same; and it comprises certain novel features which will be fully pointed out in the accompanying description and particularly specified in the claims appended thereto.

Reference is to be had to the accompanying drawings forming a part of this specification, in which the same characters of reference indicate the same parts in all the views.

Figure 1 is a longitudinal sectional view of one form of my improved stall; Fig. 2 is a front elevation of the construction shown on Fig. 1; Fig. 3 is a sectional view of a modification taken on the line 3—3 of Fig. 4; Fig. 4 is a horizontal sectional view taken on the line 4—4 of Fig. 3; Fig. 5 is a view of a detail; Fig. 6 is a transverse vertical sectional view taken on the line 6—6 of Fig. 3; and Fig. 7 is a vertical longitudinal sectional view taken on the line 7—7 of Fig. 6.

On Figs. 1 and 2 of the drawings, the numeral 1 indicates the floor of a barn in which is formed a scavenging trough or gutter 2, located at the rear ends of the stalls, which are arranged side by side to form a row in the usual way. This trough or gutter is for the purpose of carrying away refuse and filth; and to secure the greatest amount of cleanliness the dairy animal should be made to stand in the position illustrated on Fig. 1, that is, the animal should stand with its tail directly over the gutter 2, so that the excrement dropped by the cow will not foul the floor of the barn, but will fall directly into the gutter 2, where it can be washed away with a hose. It is well known, however, that dairy cows are not all of the same size, but vary from four and a half to six feet long. Hence, if a herd of cows is driven into a barn and housed in stalls of the same length, the smaller cows will be apt to stand too far toward the front of the stall to utilize the gutter 2. By means of my improved construction the size of the stall is varied to suit the length of the cow, and each cow is held in proper position with respect to the trough 2, to give the desired result.

In the practice of my invention I make a space for each stall by employing posts 4, fastened to the floor 2 at the base and to the roof 3 at the top. A pair of these posts, one behind the other, spaced a suitable distance from the gutter 2, is placed between each pair of adjacent stalls, as shown on Figs. 1 and 2.

4' is a brace for each rear post 4.

Attached to each pair of posts 4 are two pairs of cross pieces 5, one pair being fixed to the posts 4 at the bottom and the other pair near the top. The members of each pair are spaced apart to receive the ends of horizontal bars 6, which are adjustably mounted between the members 5. Each of the members 5 has two parallel rows of holes therein to receive pins 7, which pass through corresponding holes in the ends of the horizontal bars 6. One row of holes in each crosspiece 5 is for the bars 6 of one stall, and the other row is of course for the bars 6 in front of the stall adjacent.

Supported centrally of the upper bar 6 is a short chain 8, which carries a yoke 9. This yoke comprises a pair of curved members 9', which are pivoted together at their lower ends as at 10, and locked together at their upper ends so as to embrace the neck of the cow, by means of a fastening device 8' on the end of the chain 8. A chain 11 is used to fasten the bottom of the yoke 9 to the lower bar 6. This yoke will prevent the cow from moving forward away from the trough 2; but will permit the animal to move her head up and down and from side to side, so as not to interfere with the animal when feeding. For a shorter cow, the bars 6 will be moved to the right on Fig. 1, and for a longer cow they will be moved to the left.

The animal in the stall shown on Figs. 1 and 2, can be fed from a manger, or by throwing fodder on the floor 1, in front of the posts 4.

In the form shown on Fig. 3, the floor of the barn is raised at the front of the stall, as shown at 2', and each stall is separated from the adjacent stall by a short length of concrete curbing 12. Posts 14, similar to the posts 4, on Figs. 1 and 2, have their lower ends embedded in the concrete 12, and their upper ends supported by the roof. A pair of these posts is arranged between each stall and its neighbor, each post being located behind the other, and the rear posts 14 being braced by a member 14', fixed to the floor 2 at one end and united to the rear post 14 by a T-coupling at a suitable distance above the concrete 12. The posts 14, as well as the bracing members 14', may be made of gas pipe, and each pair of posts 14 is connected near its top by means of two horizontal bars 15, these horizontal bars being parallel to each other and being spaced apart in horizontal planes and connected at their ends to suitable couplings 16, carried by the posts 14. Only one of these upper horizontal bars 15 is shown on Fig. 3, but it will be understood that there will be two, one for the stall on one side of the curb, and the other for the neighboring stall on the opposite side. Similar horizontal bars 15 are arranged adjacent the lower ends of the posts 14, a pair of these lower bars 15 being carried by each curb 12 on opposite sides thereof, and being connected by suitable couplings 16', which have their ends embedded in the curb, and are also connected to the lower ends of the posts 14, if desired.

17 are transverse horizontal bars which extend across the front of the stall, these bars 17 being supported by the bars 15 at their opposite ends. One of these bars 17 is supported by two upper bars 15, and the other bar 17 is supported by two lower bars, the ends of each bar fitting into T-shaped couplings 18, which are carried by the bars 15, so that they can be moved back and forth thereon. These bars 15 have vertical apertures therethrough, and the couplings 18 carry pins 19, so that the transverse horizontal bars 17 can be locked in any adjusted position.

The yoke 9, shown on Figs. 1 and 2, is supported by a chain between the upper and lower transverse bars 17, to fit around the neck of the cow or other dairy animal, as in the former case. To the lower bar 17 is fixed a transverse board or partition 20. This board is clamped to the pipe 17 and can be either held in an upright position, as shown on Figs. 3 and 6, or turned partly over, as shown on Fig. 7. The fodder for the animal is dumped between this board and the raised portion of the floor 2'; and the floor 2', the board 20 and the concrete curbings 12, form a trough in front of the stall, from which the animal feeds. When it is desired to wash the floor of the barn, the board 20 is turned over to the position show on Fig. 7, to permit a free flow of water over the bottom of the stall to the trough or gutter 2 at the rear.

I wish to reserve to myself the right to make such changes in the size and arrangement of the parts, as fairly fall within the scope of my invention. For example, while I have shown and described my invention as a cow stall, I do not wish to limit its use to dairy animals, but I may employ it for horses, cattle, or anything else, in the manner described.

Having thus described my invention, I claim as new and desire to secure by Letters Patent:

1. An adjustable stall comprising a pair of posts on each side thereof, each pair of posts being longitudinally arranged with respect to the said stall, a cross bar supported adjacent the top and bottom of each pair of said posts, transverse horizontal bars supported by said cross bars in position to permit the head and neck of an animal to pass between the same, and means for securing said transverse horizontal bars in various positions of adjustment with respect to the cross bars to increase or decrease the length of the said cow stall.

2. A stall comprising a pair of posts adjacent each side thereof, each pair of said posts being longitudinally arranged with respect to said stall, a cross bar supported adjacent the top and bottom of each of said pair of posts, transverse horizontal bars carried by said cross bars, means for fastening said transverse bars in various positions of adjustment to increase or decrease the length of the stall, and a rotatable partition carried by the lowermost of said adjustable horizontal bars.

3. A stall comprising a pair of posts adjacent each side, a concrete curb on each side of said stall adjacent the front thereof, the lower ends of said posts being embedded in said concrete, a cross bar carried by each pair of said posts adjacent the upper portions thereof, cross bars arranged upon the inner faces of said curb, transverse horizontal bars supported by the cross bars upon said posts and said curbing in position to allow the head and neck of the animal occupying the stall to pass between them, and means for securing said transverse horizontal bars in various positions of adjustment with respect to the cross bars to increase or decrease the length of said stall.

4. An adjustable stall having a depressed floor, said depressed floor forming a shoulder with the level of the main floor in front thereof, a curb on each side of said stall adjacent the front thereof, a pair of posts adjacent each side of the stall, said posts being placed one behind the other and having their lower ends embedded in the curb, cross-bars carried by the said posts adjacent the upper portion thereof, cross-bars arranged upon the inner faces of said curb, transverse horizontal bars supported by the cross-bars upon said posts and said curbs in position to allow the head and neck of the animal occupying the stall to pass between them, means for securing said transverse horizontal bars in various positions of adjustment to increase or decrease the length of the stall, and a rotatable partition carried by the lowermost of said adjustable horizontal bars, said partition forming with the curbs and the shoulder in front of the stall, a trough to receive the fodder for the animal.

In testimony whereof I have signed my name to this specification in the presence of two subscribing witnesses.

OSCAR BISHOP STILLMAN.

Witnesses:
CHARLES NICOLLS,
WM M. VAN DUZEN, Jr.